P. BIRD.
SAW-SHARPENER.
No. 176,923. Patented May 2, 1876.
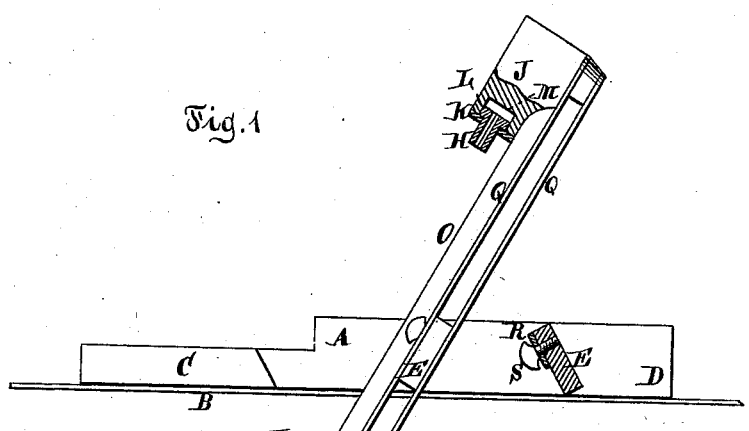
Fig. 1
Fig. 4.
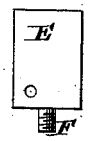
Fig. 2.
Fig. 3.
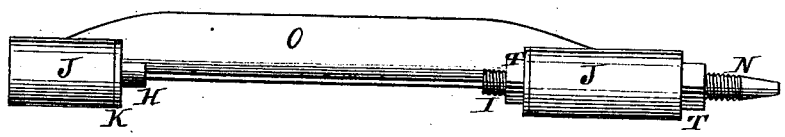
Witnesses.
Otto Hufeland.
Chas. Wahlers.
Inventor.
Peter Bird
per
Van Santvoord & Hauff
Attorneys

UNITED STATES PATENT OFFICE.

PETER BIRD, OF EAST NEW YORK, ASSIGNOR TO HIMSELF AND BARNARD I. BOZARD, OF HUMPHREY, NEW YORK.

IMPROVEMENT IN SAW-SHARPENERS.

Specification forming part of Letters Patent No. 176,923, dated May 2, 1876; application filed February 4, 1876.

*To all whom it may concern:*

Be it known that I, PETER BIRD, of East New York, county of Kings and State of New York, have invented a new and useful Improvement in Machines for Filing Saws, which improvement is fully set forth in the following specification, reference being had to the accompanying drawing, in which—

Figure 1 is a plan view, partly in section, of my improvement. Fig. 2 is a cross-section of the guide-plate, taken in the line $x\,x$, Fig. 1. Fig. 3 is a side elevation of the file-holder and guide-frame. Fig. 4 is a separate view of one of the guides.

Similar letters indicate corresponding parts.

This improvement relates to mechanism for filing saws; and consists in a guide-plate intended to be set parallel with and near to the saw to be sharpened, and provided with adjustable guides, which are arranged vertically upon the guide-plate, so that they can enter a groove provided for them in a frame attached to the file-holder, whereby the direction of the movement of the file-holder is controlled and made to conform to the angle or direction in which the guides are adjusted. The guides are provided at their sides with adjustable stops, which limit the depth of their entrance into the groove of the guide-frame, and the file-holder is provided with sockets which receive the ends of the file, the socket which receives the tail end of the file being free to rotate to and fro in its head, while that which receives the head end of the file is formed in the end of the screw, by turning which the faces of the file are brought into proper position, and set at any desired angle, and are held stationary after they are adjusted by means of jam-nuts arranged upon the screw-socket at the ends of the head, through which it works.

The letter A designates the guide-plate, whose construction is such that it can be arranged adjacent and parallel with the saw B to be sharpened, in which position it is held stationary by any suitable means, and for the purpose of holding it stationary; part of it, as seen at C, can be raised above the surface to which the guides are attached, so that it can be grasped by a clamp or other convenient holding device. The part D of the guide-plate has a flat surface, arranged in a plane at right angles to the plane of the saw, and bearing adjustable guides E, one or more, consisting of a vertical piece, whose wider sides are straight and parallel, as that shown in the drawing.

The guides are adjusted on the plate in such a manner that the lines of their faces shall be exactly parallel with the bevel to be given to the teeth of the saw, respectively. This adjustment can be effected in any convenient manner. In this example I have effected it by forming on the bottom of the guides a screw, F, which goes through a hole in the plate D, and receives in the under side of the plate a nut, G, which enables me to clamp the guide to the plate in whatever position it has been adjusted thereon.

The file is held by its ends in two sockets, H I, arranged in the heads J J of the file-holder, the socket H for the tail end of the file being held in its head J by a perforated plate, K, which fits around its reduced part, as shown in Fig. 1, and allows its enlarged part L to rotate in the recess M without permitting it to fall out therefrom. The socket I, which receives the head end of the file, is made in the end of a screw, N, which works through the head J at the other end of the file-holder, and enables me to clamp the file firmly in its required position. The screw is prevented from working loose by jam-nuts T T, which bear against the ends of the head. The file-holder O is provided at one side with a straight groove, P, which is of a suitable width to receive one of the guides, and which is otherwise so constructed and arranged that it can slide back and forth upon the guide from one end of the groove to the other.

In this example I have made the groove by arranging along one side of the holder two metallic plates, Q Q, separated from each other by a distance equal to the thickness of the guides, the outer plate being yielding, so as to enable me to force the grooved holder upon the guide.

The depth to which the grooved holder is forced upon the guide governs the depth to which the file enters the interspaces of the saw-teeth, and this depth is adjusted by adjustable rests, consisting of slotted plates R R, secured to one side of the guides by screws S, which go through their slots and enter threaded holes in the bodies of the guides. (See Figs. 1 and 2.) The edges of the plates Q Q, which form the groove of the file-holder, rest on the plate R, and the depth to which the holder sinks on the guide is thereby determined.

What I claim as new, and desire to secure by Letters Patent, is—

The guide-plate A, provided with adjustable guides E, in combination with the file-holder O, having a longitudinal groove, P, and carrying at one end a screw, N, provided with lock-nuts T T and socket I, and at the other end with a head, J, having a recess, M, in which is arranged the rotating socket H, all substantially as and for the object specified.

In testimony that I claim the foregoing I have hereunto set my hand and seal this 28th day of January, 1876.

PETER BIRD. [L. S.]

Witnesses:
J. VAN SANTVOORD,
E. F. KASTENHUBER.